US008817366B2

(12) United States Patent
Rapp

(10) Patent No.: US 8,817,366 B2
(45) Date of Patent: Aug. 26, 2014

(54) OPTICAL FIBER AMPLIFIER WITH IMPROVED TRANSIENT PERFORMANCE

(75) Inventor: Lutz Rapp, Deisenhofen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 202 days.

(21) Appl. No.: 13/394,684

(22) PCT Filed: Sep. 7, 2009

(86) PCT No.: PCT/EP2009/061548
§ 371 (c)(1),
(2), (4) Date: Apr. 4, 2012

(87) PCT Pub. No.: WO2011/026526
PCT Pub. Date: Mar. 10, 2011

(65) Prior Publication Data
US 2012/0182603 A1    Jul. 19, 2012

(51) Int. Cl.
*H04B 10/17*    (2006.01)
*H04B 10/12*    (2006.01)

(52) U.S. Cl.
USPC .................................. 359/341.41; 359/341.4

(58) Field of Classification Search
USPC .................................. 359/341.4, 341.41, 334
See application file for complete search history.

(56) References Cited

U.S. PATENT DOCUMENTS

| | | | |
|---|---|---|---|
| 5,986,799 A * | 11/1999 | Itou et al. ..................... 359/337 | |
| 6,377,394 B1 | 4/2002 | Drake et al. | |
| 6,396,625 B1 * | 5/2002 | Nakaji ..................... 359/341.41 |
| 6,433,922 B1 * | 8/2002 | Ghera et al. .................. 359/334 |
| 6,476,961 B1 * | 11/2002 | Ye et al. ..................... 359/341.43 |
| 6,724,524 B1 * | 4/2004 | Evans et al. .................... 359/334 |
| 6,850,360 B1 * | 2/2005 | Chen et al. ..................... 359/334 |
| 7,038,841 B2 * | 5/2006 | Chang et al. .................. 359/334 |
| 8,094,369 B2 * | 1/2012 | Zhuber-Okrog ........... 359/337.1 |
| 2001/0012146 A1 * | 8/2001 | Shiozaki et al. ............... 359/337 |
| 2002/0024721 A1 * | 2/2002 | Tsuzaki et al. ................ 359/334 |
| 2002/0044317 A1 * | 4/2002 | Gentner et al. ............... 359/124 |
| 2003/0011855 A1 * | 1/2003 | Fujiwara ....................... 359/177 |
| 2004/0052453 A1 * | 3/2004 | Mao et al. ........................ 385/27 |
| 2004/0091206 A1 | 5/2004 | Denkin et al. |
| 2004/0246566 A1 * | 12/2004 | Miyamoto et al. ............ 359/334 |
| 2008/0024859 A1 * | 1/2008 | Tamaoki .................. 359/341.31 |
| 2008/0204860 A1 | 8/2008 | Rapp |
| 2008/0212167 A1 * | 9/2008 | Van Schyndel et al. . 359/341.41 |
| 2009/0201576 A1 * | 8/2009 | Bolshtyansky et al. .. 359/341.33 |

FOREIGN PATENT DOCUMENTS

DE    10 2005 060 019 A1    6/2007

* cited by examiner

*Primary Examiner* — Eric Bolda
(74) *Attorney, Agent, or Firm* — Nelson Mullins Riley & Scarborough LLP

(57) ABSTRACT

An optical amplifier with improved transient performance has two amplifier stages and a dispersion compensating fiber inserted between the amplifier stages. A control unit generates a pump control signal for a common pump source pumping both amplifier stages via a power splitter. The pump control signal has a feedforward component with a delayed reaction. A feedforward delay time is adjusted to minimize gain variations resulting from input power drops. In a preferred embodiment, the splitting ratio of the power splitter is adjustable to achieve, for instance, either optimum steady-state performance or optimum transient performance.

13 Claims, 3 Drawing Sheets

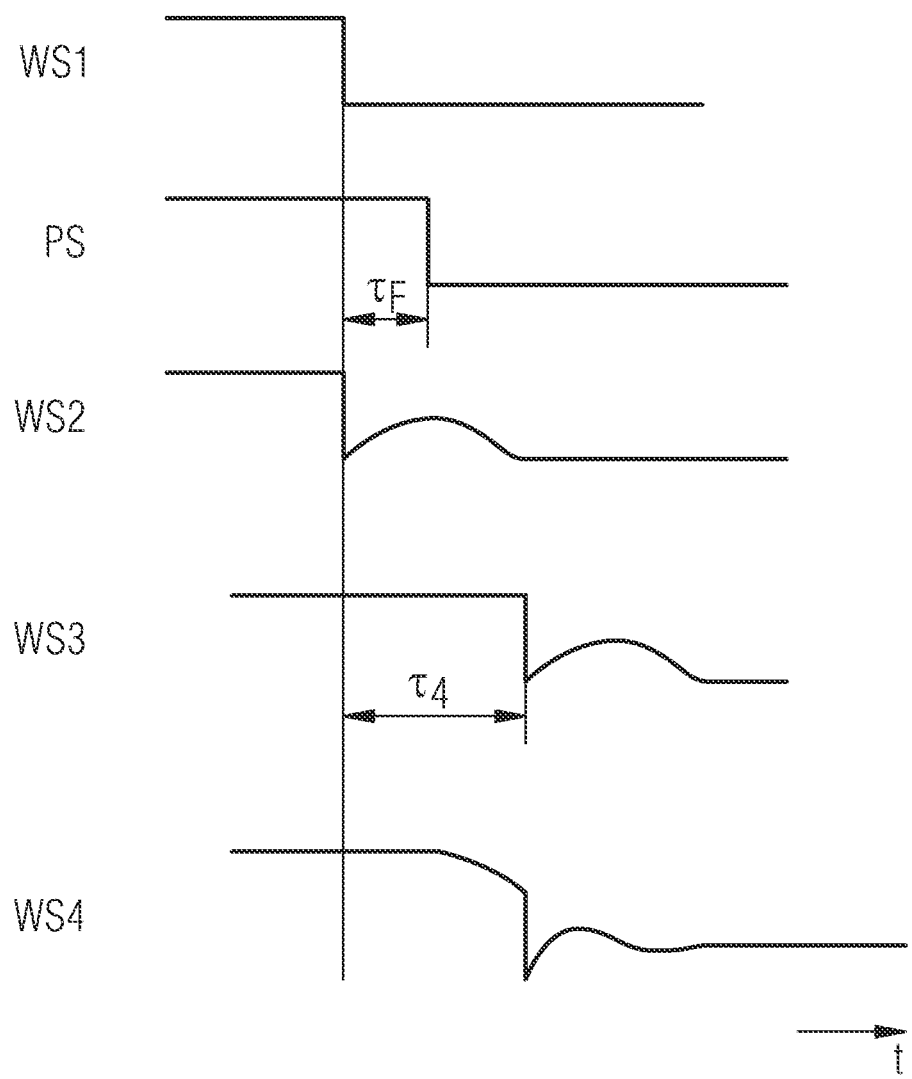

Channel input power: -12.0 dBm

Channel input power: -6.0 dBm

SP:
- ——— 30,0 %
- ----- 40,0 %
- —·—·— 50,0 %
- ------- 60,0 %
- ——— 70,0 %

OPTICAL FIBER AMPLIFIER WITH IMPROVED TRANSIENT PERFORMANCE

FIELD OF THE INVENTION

The invention refers to an optical fiber amplifier with improved transient performance making use of pump power splitting.

BACKGROUND OF THE INVENTION

Optical fiber amplifiers are widely used for signal amplification in optical data transmitting networks based on wavelength-division multiplexing (WDM). Changes in network configuration, component failures, fiber breaks or protection switching can cause abrupt changes of optical input power. These changes cause fast changes of amplifier output power which can be transferred to other wavelengths due to nonlinear fiber effects and the non-ideal dynamic properties of erbium-doped fiber amplifiers (EDFAs). These changes can propagate to other sites leading to optical power fluctuations across the whole network and possibly to oscillations. Thus, even channels that are not directly affected by the switching operations or failures can suffer from some performance degradation at the receivers.

Furthermore, gain variations can also accumulate in a cascade of amplifiers. Thus, even small gain variations can result in significant power changes at the receivers. Therefore, efficient amplifier control techniques are required that allow to keep the inversion and as a consequence the gain profile of an amplifier or an amplifier stage relatively constant even if the input power changes.

Fast electronic control architectures are currently the most economical solution to stabilize the gain of EDFAs. Commonly, feedback architectures are used since they allow to adjust the gain or output power to given target values and to compensate for control errors. However, purely feedback based controllers cannot meet the transient performance requirements for dynamically reconfigured networks. Fortunately, feedback controllers can be complemented by a feedforward controller. The combination of the two types of controllers provides quick response to any changes with the feedback system cleaning up for any error in the predetermined adjustment made by the feedforward control.

On the other hand, cost reduction has become a continuing task. Therefore pump power splitting has become a widely used technique to reduce amplifier cost. If pump power splitting is applied to amplifier stages that are separated by a component afflicted with delay such as a dispersion compensating fiber (DCF) unacceptable poor transient performance is gained. Therefore, pump splitting is typically applied only to stages that are all before the DCF or all after the DCF.

OBJECTS AND SUMMARY OF THE INVENTION

Therefore it is an object of the present invention to provide a fiber amplifier at reasonable costs with improved transient performance.

The invention refers to an optical amplifier with
 a first amplifier stage receiving an input signal (WS1) and a second amplifier stage connected in series and outputting an output signal;
 an optical delay element inserted between said amplifier stages;
 a common pump source generating a pump signal;
 a power splitter, which input is connected to the common pump source and which outputs are connected to the first amplifier stage and the second amplifier stage respectively;
 a control unit determining the power of the pump signal, said control unit receiving a feedforward control signal derived from an optical input signal and delaying the reaction of the feedforward control by a feedforward delay time, which is less than a delay time of said optical delay element, thereby reducing the gain variation of an output signal.

The maximum gain variation of the output signal is minimized by setting the right delay of the feedforward control.

Dispersion of the transmission fiber is advantageously compensated if the optical delay element is a dispersion compensating fiber.

For higher technical requirements it is necessary that the control unit is in addition extended by feedback control of amplifier gain and/or output power.

It is advantageously that the pump signal splitter is a variable splitter.

This allows performance adaptation to noise and transient requirements.

A possible control unit comprises
 a second delay element for delaying the feedforward control signal and an adder connected to an output of the second delay element and receiving a feedforward control signal and
 a feedback control circuit for receiving an electrical measuring input signal derived from the optical input signal and receiving an electrical measuring output signal derived from the optical output signal and generating a feedback control signal, which is combined with the feedforward control signal.

More flexible is a control unit implemented as programmable processor receiving the electrical measuring signals derived from the input signal and output signal respectively.

This allows simple adaptation of the amplifier performance according to network requirements.

The amplifier performance is optimized by choosing the delay of the second delay element and the splitting factor according to network requirements.

The amplifier performance using a processor solution is optimized by programming a delay of the pump signal related to the feedforward control signal while the splitting factor of the splitter is chosen according to network requirements.

For a more flexible solution it is necessary that the delay of the feedforward control and the splitting factor are adjustable by adapting control parameters of the control unit.

The transient performance can be further improved if the second amplifier stage is pumped via a pump signal delay element.

This allows a smaller delay between the power drop and the reduction of the first pump signal pumping the first amplifier stage.

BRIEF DESCRIPTION OF THE DRAWINGS

A presently preferred example of the invention is described below with reference to accompanying drawings, where
FIG. 2 shows a time diagram illustrating the gain performance.

DETAILED DESCRIPTION OF THE INVENTION

Figure 1:
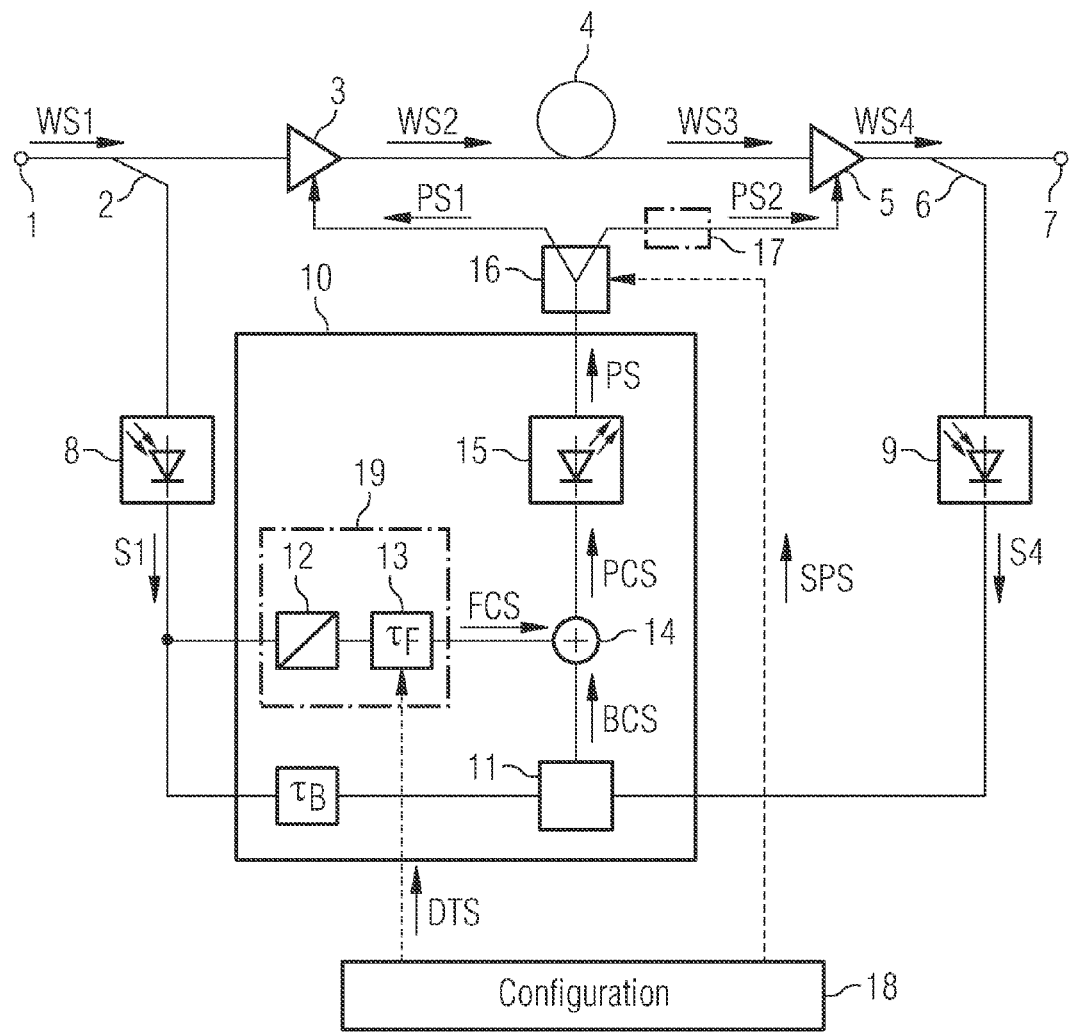
FIG. 1 shows a simplified bloc diagram of an EDFA.

FIG. 1 illustrates a simplified block diagram of a fiber amplifier (EDFA). Details of the fiber amplifier, which are not part of the invention like couplers for inserting pump signals or isolators, are not shown for clarity reasons.

The fiber amplifier comprises two amplifier stages 3 and 5 connected in series. Each stage comprises a separately pumped doped optical fiber. A delay element 4, e.g. a dispersion compensating fiber (DCF) and/or an optical filter with a delay $\tau_4$, is inserted between said amplifier stages. A single pump source 15 generates a pump signal PS, which is divided by an optical power splitter 16 into a first pump signal PS1 and a second pump signal PS2 pumping the first and the second amplifier stage respectively. The stages may be pumped forward or backward. A control unit 10 controls the power of a pump signal PS generated by said single pump source 15.

The control unit 10 makes use of feedforward control and feedback control.

A feedforward control generates a feedforward component of the pump control signal PCS. The illustrated feedforward control comprises a first splitter 2 arranged between amplifier input 1 and the first amplifier stage 3, a first optical-electrical converter 8 (photo diode) converting an amplifier input signal WS1 into an electrical measurement input signal S1, and a feedforward control circuit 12 receiving the measurement input signal S1 and converting it into a feedforward control signal FCS. The feedforward control further comprises a (variable) electrical feedforward control delay element 13 delaying the reaction of the feedforward control by a feedforward delay time $\tau_F$. The shown feedforward control delay element illustrates only an example for delaying the reaction of the feedforward control; the delay element 13 can be inserted at different positions in the control loop or implemented by software. An adder 14 receives the delayed feedforward control signal FCS.

The feedback control comprises the first splitter 2, a second splitter 6 arranged between an output of the second amplifier stage 5 and an amplifier output 7, the first optical-electrical converter 8 (photo diode) and a second optical-electrical converter 9 converting the amplifier input signal WS1 and an amplifier output signal WS4 into the electrical input measuring signal S1 and an electrical output measuring signal S4 respectively. Both measuring signals are fed to a feedback control unit 11. The feedback control unit generates a feedback control signal BCS, which is fed to the adder 14 and added to the feedforward control signal FCS. To avoid unwanted intervention of the feedback control after a channel drop/add the measurement input signal S1 can be delayed by a feedback delay element 19 (which might be also implemented as a low pass filter) with feedback delay time $\tau_B$ before it is fed to the feedback control circuit. The resulting pump control signal PCS controls the power of pump source 15 (if necessary via a converter, e.g. if the pump control signal is a digital data signal). The shown feedback control is only an example which may be adapted according to different requirements.

The control unit 10 is preferable designed as programmable processor allowing more flexibility and easy adaptation to network requirements. The described elements are then substituted by program functions. A converter (not shown in FIG. 1) is then inserted to convert a digital pump control signal into a control current.

A preferable embodiment of the invention comprises also a variable pump signal splitter 16 allowing different splitting factors SP.

The transient performance and the noise performance of the amplifier depend also on the splitting ratio. The parameter splitting ratio denotes here the portion of the total pump power launched into the first stage. If excellent noise performance is required, quite large splitting ratios have to be used. However, this comes along with quite poor transient performance. If there is sufficient margin, it is worth to decrease the splitting ratio in order to improve transient performance. The amplifier can be adapted according to the network performance.

Power drops constitute the most critical transient scenarios in optical networks since they can result from accidental events such as fiber cuts or malfunctions of network elements and the induced power changes are not predictable. Therefore, the following considerations focus on the power drops.

Variations in the amplifier gain will occur after a power drop even if the pumping power is optimally matched to the change of input power. These variations are due to the memory effect of the pumping mechanism. Also, a delayed reaction of the feedforward control of a single stage leads to an increase of the peak value of a gain overshoot. Furthermore, the sensitivity of the amplifier gain to variations of the input power increases also with growing input power. This implies that at higher input powers already small delays in the pumping circuit lead to almost maximum gain variations.

In the following, a technique is described reducing gain variations in multi-stage amplifiers with pump power splitting. The splitting ratio is usually set before the gain variation is minimized.

For this example, it is assumed that forty channels of equal power with a spacing of 100 GHz (0.8 nm) in the conventional wavelength band (C-band) are launched into the optical amplifier. At zero on the time axis, a drop of 39 out of 40 channels takes place. The power reduction happens within an infinitesimal short period of time. This constitutes the worst case in optical networks if channels are dropped or a fiber is cut. In addition, it is assumed that the feedforward control adjusts the pump power to a new value that provides exactly the same gain value for the new input power on steady-state conditions.

According to the invention the reaction of the feedforward control signal FCS is delayed by an amount $\tau_F$ less than the delay time $\tau_4$ of the optical delay 4 (DCF), typically less than half of the delay of the optical delay time $\tau_4$. An optimum delay value $\tau_F$ within the typical range (0.25-0.75) $\tau 4$ is usually determined by experiment but may also be calculated.

FIG. 2 shows the output powers of the amplifier stages 3 and 5 versus time if 39 of 40 channels (channel=signal) of the WDM signal WS1 are dropped. In that moment the amplification of the first amplifier stage 3 and therefore the output power of the remaining signal WS2 is constant but increases because the first pump signal PS1 is not reduced to an adequate amount. After a short time after the pump power is altered the output power of the remaining signal WS2 is reduced to a final value and the amplification of the first amplifier stage has again reached the previous value.

The output signal WS2 of the first amplifier stage 3 is delayed by the delay time $\tau_4$ of the DCF before it reaches the input of the second stage. But the power of the second pump signal PS2 injected into this amplifier stage 5 has been reduced simultaneously with the first pump signal PS1 after the feedforward delay time $\tau_F$. Therefore the second pump signal PS2, the inversion of the second amplifier stage 5 and its output power is already reduced before a signal WS3 delayed by $\tau_4$ reaches the input of the second stage because $\tau_4 > \tau_F$. The bottom line in FIG. 2 shows the resulting output signal WS4. The maximum gain variation and the settling time of the output signal are significantly reduced.

An additional pump signal delay element 17 delaying the second pump signal PS2 improves the performance because the delay time between the drop of the amplifier input power and the reaction of the feedforward control signal and therefore the power of the first pump signal PS1 can be reduced. Of course the attenuation of the pump signal delay element 17 has to be taken into account.

Figure 3A:
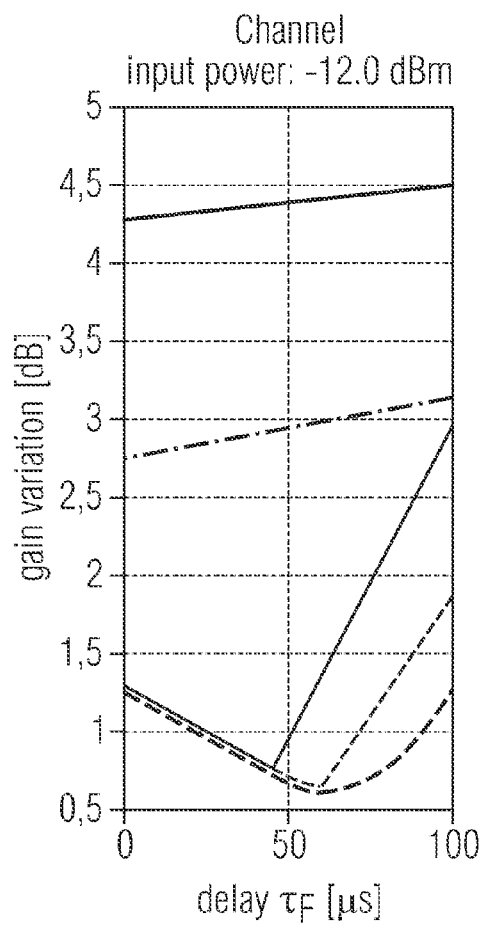
FIG. 3A and FIG. 3B show diagrams illustrating the gain performance for different splitting factors.
Figure 3B:
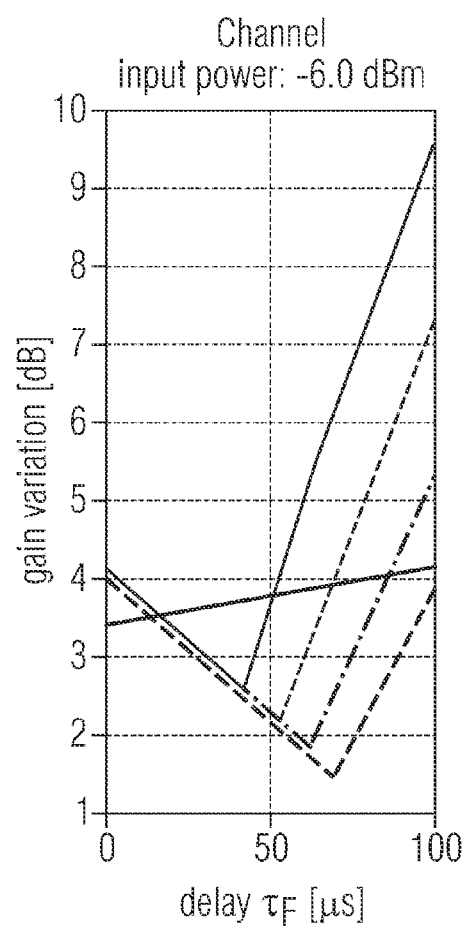

FIG. 3A and FIG. 3B illustrate the influence of the splitting factor SP (pump power of SP1 of 3: pump power of SP2) on transient performance. The diagrams are plotted for channel powers of −12 dB and −6 dB. The magnitude of gain variation due to power drops versus delay of the feedforward control is shown. Except for small input powers (FIG. 3a) or small splitting ratios (30%) an optimum delay τ providing a minimum of gain variations decreases with an increased splitting factor SP (FIG. 3b).

In a preferred embodiment, the variable delay element 13 and the splitting factor SP are adjustable by control signals DTS and SPS, preferable controlled by software. The splitting factor is adjusted by a control signal SPC. The control parameters may be adapted to the network requirements by a configuration unit 18 or even automatically, e.g. to achieve either optimum steady-state performance or optimum transient performance. The invention may be also used in amplifiers with more than two cascaded amplifier stages separated by one or more delay elements fed by the same pump.

The present invention is not limited to the details of the above described principles. The scope of the invention is defined by the appended claims and all changes and modifications as fall within the equivalents of the scope of the claims are therefore to be embraced by the invention. Especially analogue control processing can be substituted by digital data processing.

REFERENCE SIGNS

1 amplifier input
2 power splitter
3 first amplifier stage
4 optical delay element, DCF
5 second amplifier stage
6 second power splitter
7 amplifier output
8 first electrical-optical converter
9 second electrical-optical converter
10 control unit
11 feedback control circuit
12 feedforward control circuit
13 (variable) feedforward delay element
14 adder
15 pump source
16 (variable) pump signal splitter
17 pump signal delay element
18 configuration unit
19 feedback delay element
WS1 amplifier input signal at input 1
WS2 signal at output of 3
WS3 signal at output of 4
WS4 amplifier output signal at output of 5
BCS feedback control signal
FCS feedforward control signal
PCS pump control signal
PS pump signal
PS1 first stage pump signal
PS2 second stage pump signal
S1 electrical input measuring signal
S4 electrical output measuring signal
SP splitting factor
DTS delay time control signal
SPS splitting factor control signal
$\tau_4$ delay time of 4
$\tau_F$ feedforward delay time of 13
$\tau_B$ feedback delay time of 19

The invention claimed is:

1. An optical fiber amplifier with improved transient performance, comprising:
   a first amplifier stage receiving an input signal and a second amplifier stage connected in series with said first amplifier stage and outputting an output signal;
   an optical delay element inserted between said first and second amplifier stages;
   a common pump source generating a pump signal;
   a power splitter having an input connected to said common pump source and outputs connected to said first amplifier stage and said second amplifier stage, respectively;
   a control unit configured for determining a power of the pump signal, said control unit generating a feedforward control signal derived from an optical input signal and delaying a reaction of the feedforward control by a feedforward delay time, which is less than a delay time of said optical delay element, reducing a gain variation of the output signal.

2. The optical amplifier according to claim 1, wherein said optical delay element is a dispersion compensating fiber.

3. The optical amplifier according to claim 1, wherein said control unit is further configured for feedback control of amplifier gain and/or output power.

4. The optical amplifier according to claim 3, wherein said power splitter is a variable pump signal splitter.

5. The optical amplifier according to claim 4, wherein said control unit comprises:
   a feedforward control circuit and a feedforward delay element connected in series and generating the feedforward control signal;
   an adder connected to receive the feedforward control signal; and
   a feedback control circuit for receiving an electrical input measuring signal derived from the amplifier input signal and receiving an electrical output measuring signal derived from the amplifier output signal and generating a feedback control signal, which is fed to said adder and combined with the delayed feedforward control signal.

6. The optical amplifier according to claim 4, wherein said control unit comprises:
   a feedforward control circuit and a feedforward delay element connected in series and generating the feedforward control signal;
   an adder connected to receive the feedforward control signal; and
   a feedback control circuit for receiving an electrical input measuring signal derived from the amplifier input signal and receiving an electrical output measuring signal derived from the amplifier output signal and generating a feedback control signal, which is fed to said adder and combined with the delayed feedforward control signal.

7. The optical amplifier according to claim 4, wherein said control unit is implemented as a programmable processor connected to receive electrical measuring signals derived from the amplifier input signal and the amplifier output signal, respectively.

8. The optical amplifier according to claim 5, wherein the feedforward delay time of said feedforward delay element and the splitting factor are chosen according to network requirements.

9. The optical amplifier according to claim 7, wherein the feedforward delay time of the feedforward control signal and the splitting factor of said power splitter are chosen according to network requirements.

10. The optical amplifier according to claim 9, wherein the feedforward delay time and the splitting factor are adjustable or programmable.

11. The optical amplifier according to claim 8, wherein the feedforward delay time and the splitting factor are adjustable or programmable.

12. The optical amplifier according to claim 4, which comprises a pump signal delay element, and wherein said second amplifier stage is pumped via said pump signal delay element.

13. The optical fiber amplifier according to claim 5, which comprises a feedback delay element delaying the electrical input measuring signal fed to said feedback control circuit.

* * * * *